United States Patent [19]

Momiyama et al.

[11] 4,310,221
[45] Jan. 12, 1982

[54] VARIABLE SOFT-FOCUS LENS

[75] Inventors: Kikuo Momiyama, Yokohama; Shin Yamaguchi, Hiratsuka, both of Japan

[73] Assignee: Canon Kabushiki Kaisha, Tokyo, Japan

[21] Appl. No.: 84,102

[22] Filed: Oct. 12, 1979

[30] Foreign Application Priority Data

Oct. 13, 1978 [JP] Japan ................ 53-126563

[51] Int. Cl.³ .................... G02B 9/34; G02B 13/20
[52] U.S. Cl. ........................ 350/431; 350/472
[58] Field of Search ............... 350/188, 223, 431, 472

[56] References Cited

U.S. PATENT DOCUMENTS

| | | | |
|---|---|---|---|
| 2,502,509 | 4/1950 | Cook | 350/223 |
| 4,124,276 | 11/1978 | Okano et al. | 350/188 |

FOREIGN PATENT DOCUMENTS 234743  6/1925  United Kingdom ............... 350/223

Primary Examiner—John K. Corbin
Assistant Examiner—Scott J. Sugarman
Attorney, Agent, or Firm—Toren, McGeady & Stanger

[57] ABSTRACT

The present invention relates to a lens realizing a soft-focus effect by changing the air space between the front lens group with a positive power and the rear lens group with a negative power, thus increasing selectively the spherical aberration among the Seidel aberrations and maintaining the other aberrations constant. The front lens group consists of a positive meniscus lens with a convex surface at the front side and a positive meniscus lens consisting of a bi-convex lens and a bi-concave lens, being cemented on each other in sequence, while the rear lens group consists of an aperture, a bi-concave lens and a positive lens consisting of a negative and a positive lens being cemented on each other in sequence.

3 Claims, 48 Drawing Figures

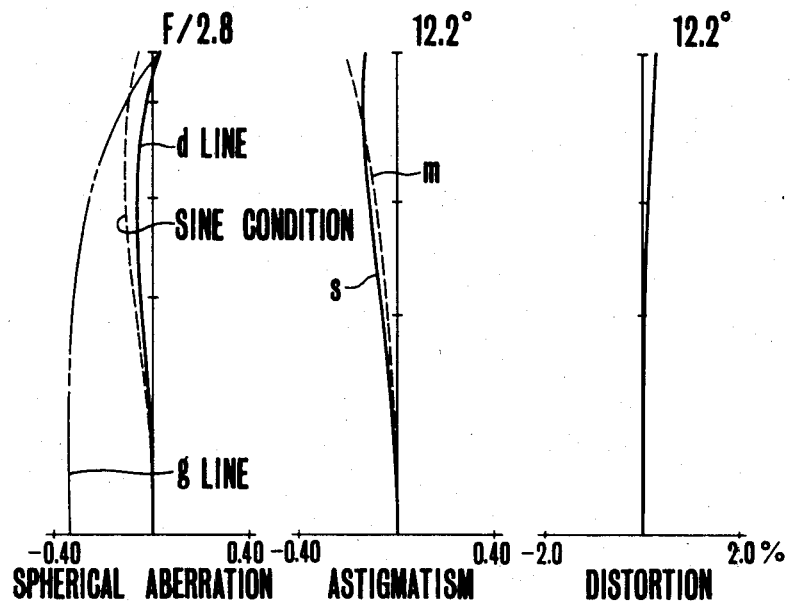
FIG.7A  FIG.7B  FIG.7C
FIG.7D
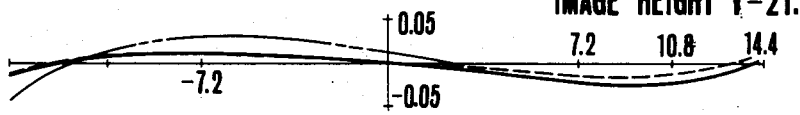
FIG.7E
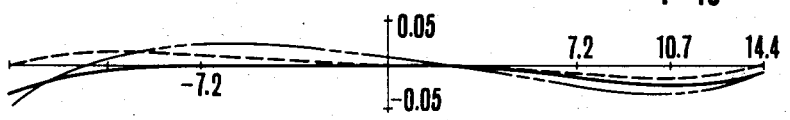
FIG.7F
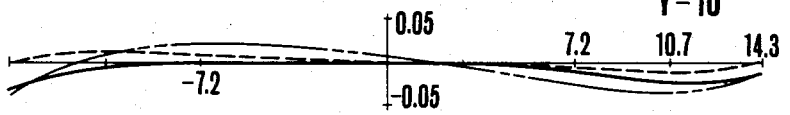
FIG.7G
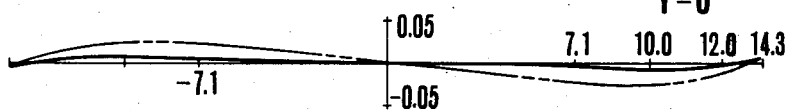

TRANSVERSE ABERRATION

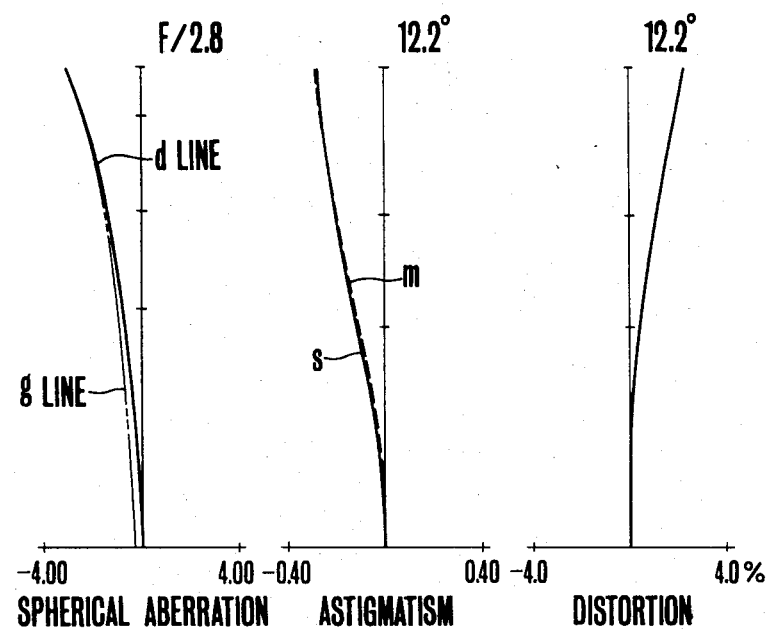

VARIABLE SOFT-FOCUS LENS

BACKGROUND OF THE INVENTION

The present invention relates to a variable soft-focus lens realizing a desirable soft-focus effect by changing the air space or spaces in the lens system so as to change the aberration amount in the total lens system.

Several photographing lenses or patents describing them with variable air space or spaces for obtaining the soft-focus effect are known. The recent example is U.S. Pat. No. 4,124,276.

The first condition required for a soft-focus lens is that, in the soft-focus photographing state, only the spherical aberration out of the third-order aberrations changes substantially, while the variation of the astigmatism, the coma and the chromatic aberration are small and further the soft-focus effect can be obtained evenly all over the whole picture plane. The reason is that no matter how small the variation of aberrations other than the spherical aberration is, if the amount of the spherical aberration is short, only the pictures such as are taken with a lens whose aberrations are improperly corrected are obtained, which do not produce a nice visual effect. Further, even if the amount of spherical aberration is enough, when the spherical aberration takes place partially an attractive picture cannot be obtained.

However, contrary to a lens which generates a constant amount of spherical abberation, a lens which is able to change the amount of spherical aberration and to extinguish most of the aberration is very advantageous for focusing. The reason is that it is remarkably difficult to carry out the focusing by looking at the image formed on the focusing screen when the spherical aberration is sufficient enough to obtain a fine soft-focus effect, while it is possible to increase the focusing accuracy if the focus effect is eliminated. Consequently, the better the aberrations are compensated when the focus effect is eliminated, the better the focusing can be carried out. Further, if a picture can be taken in a well corrected state, the lens is quite in a position to carry out the photographing without the soft-focus effect, which is profitable.

However, it is a contradictory demand that when the spherical aberration is increased, the change of other aberrations are checked, while all the aberrations are well compensated in the ordinary photographing state.

SUMMARY OF THE INVENTION

A purpose of the present invention is to cause a sufficient spherical aberration, while keeping other aberrations as small as possible when the air space or spaces are varied out of the ordinary state.

Another purpose of the present invention is to correct the aberrations well in the ordinary state.

For the above purposes, the power of the front lens group closer to the object than the variable air space is chosen positive, while the power of the rear lens group closer to the image is chosen negative, whereby the front lens group has a positive meniscus lens having a convex surface toward the object and a positive meniscus compound lens, while the rear lens group has a negative lens and a positive compound lens, whereby an air space is provided between the negative lens and the positive compound lens.

More concretely, the meniscus compound lens in the front lens group consists of a bi-convex lens and a bi-concave lens cemented on each other in sequence, while the negative lens in the rear lens group is a bi-concave lens having a stronger surface at the image side and the compound lens consists of a negative lens and a bi-convex lens cemented on each other, whereby the aperture is movable together with the rear lens group.

Hereby, further, more than one of the following conditions are satisfied;

(1) $1.7(1/f) < (1/f_1) < 2.2(1/f)$
(2) $0.4 < |(R_1 - R_2)/(R_1 + R_2)| < 0.6 \quad 0 < R_1, 0 < R_2$
(3) $1.48 < N_1 < 1.62$
(4) $0.25f < R_7 < 0.32f$
(5) $1.7 < N_2, 1.7 < N_6$
(6) $28 < \nu_3 < 35$
(7) $40 < (\nu_4 + \nu_5)/2 < 55$ wherein
f: Focal length of the total system
$f_1$: Focal length of the front lens group
$R_1$: Radius of curvature of the front surface of the meniscus lens in the front lens group
$R_2$: Radius of curvature of the rear surface of the meniscus lens in the front lens group
$R_7$: Radius of curvature of the rear surface of the bi-concave lens in the rear lens group
$N_1$: Refraction index of the meniscus lens in the front lens group
$N_2$: Refraction index of the positive lens of the compound lens in the front lens group
$N_6$: Refraction index of the positive lens of the compound lens in the rear lens group
$\nu_3$: Abbe's number of the negative lens of the compound lens in the front lens group
$\nu_4$: Abbe's number of the bi-concave lens in the rear lens group
$\nu_5$: Abbe's number of the negative lens of the compound lens in the rear lens group As explained above, it is requested in the case of the present invention that the spherical aberration is varied largely, while the variation of the astigmatism, the coma or the chromatic aberration is checked as small as possible, whereby further it is a desirable condition to make the variation of the air space or spaces small so as to obtain an effective soft-focus effect.

The basic technical idea of the present invention is that the refractive power of the front lens group having a positive power and that of the rear lens group having a negative power are by far stronger than those of the known lenses of the same type, that with reference to the control of the aberrations of the first lens group and the rear lens group, the spherical aberration for each lens group is caused as large as possible, while the astigmatism, the coma and the chromatic aberration for each lens group are corrected as small as possible.

BRIEF DESCRIPTION OF THE DRAWINGS

FIGS. 7A to 7G respectively show the curve of an aberration of the second embodiment in the ordinary photographing state.

FIGS. 12A to 12G respectively show the curve of an aberration of the third embodiment in the soft-focus state.

DESCRIPTION OF THE PREFERRED EMBODIMENTS

Figure 1:
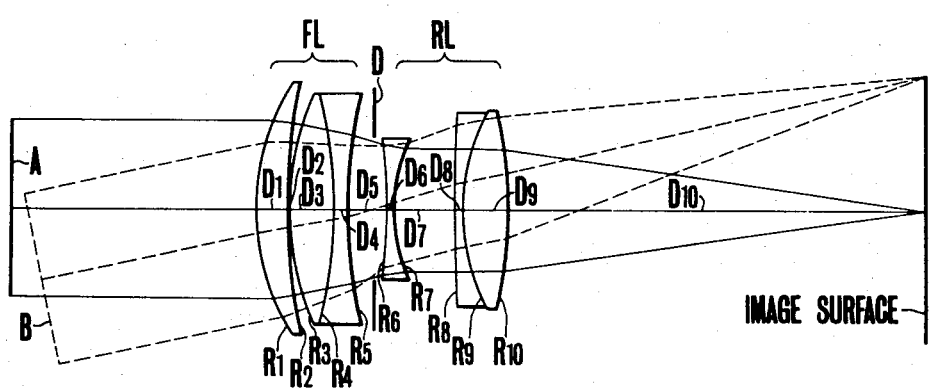
FIG. 1 shows the first embodiment of the lens in section, whereby the lens is focused at the infinite distance in the ordinary photographing state.
Figure 2:
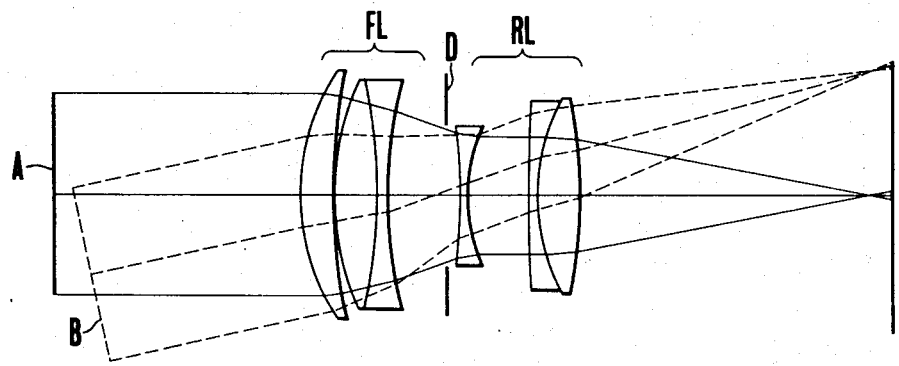
FIG. 2 shows the first embodiment of the lens in section, whereby the lens is focused at the infinite distance in the soft-focus state.
Figures 3A, 3B, 3C:
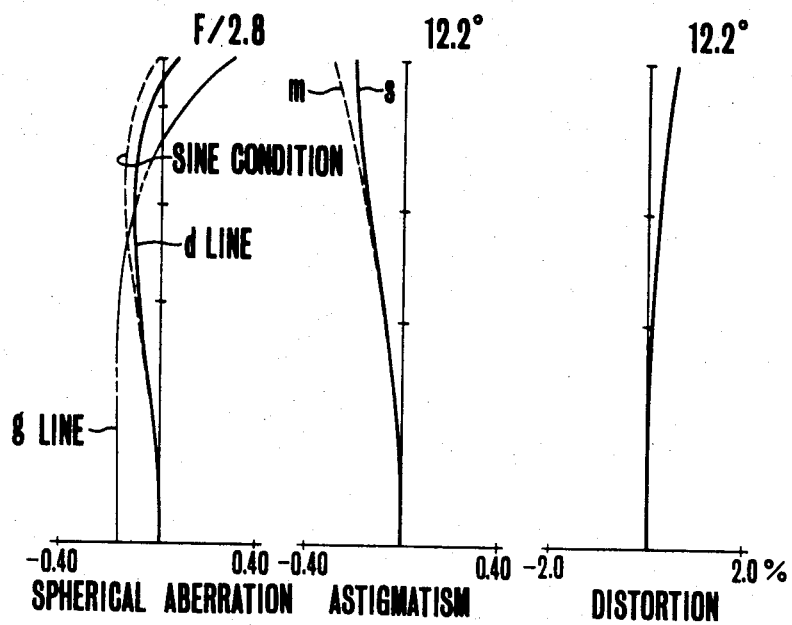
FIGS. 3A to 3G respectively show the curve of an aberration of the first embodiment in the ordinary photographing state.
Figure 3D:
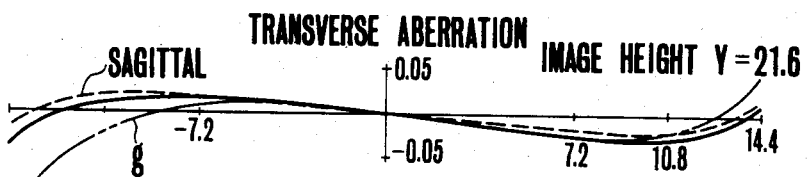
Figure 3E:
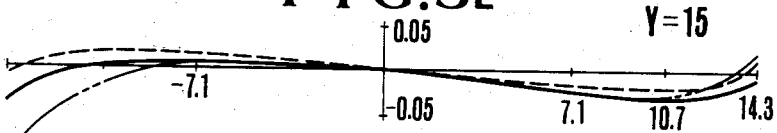
Figure 3F:
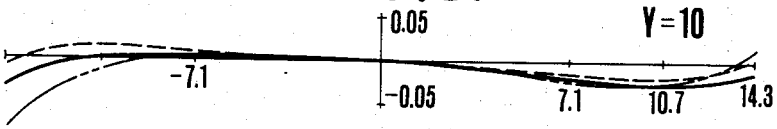
Figure 3G:
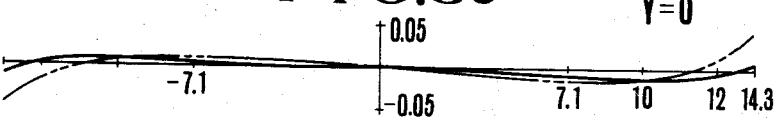
Figures 4A, 4B, 4C:
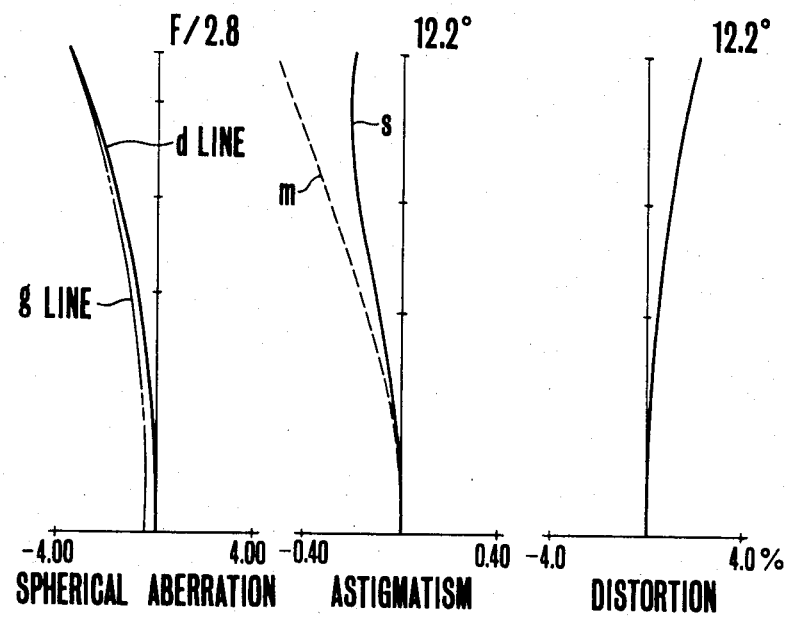
FIGS. 4A to 4G respectively show the curve of an aberration of the first embodiment in the soft-focus state.
Figure 4D:
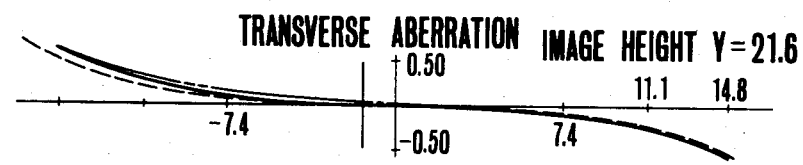
Figure 4E:
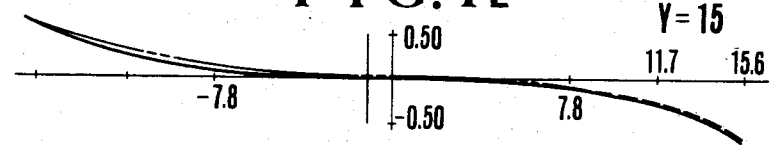
Figure 4F:
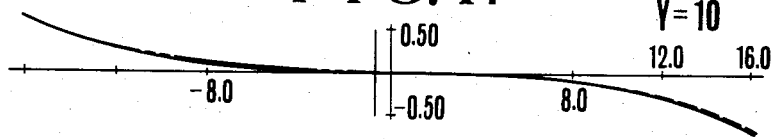
Figure 4G:
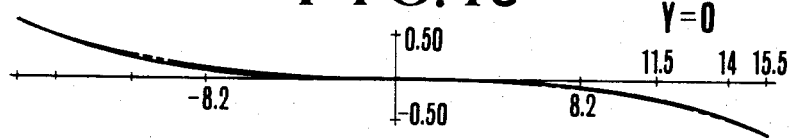
Figure 5:
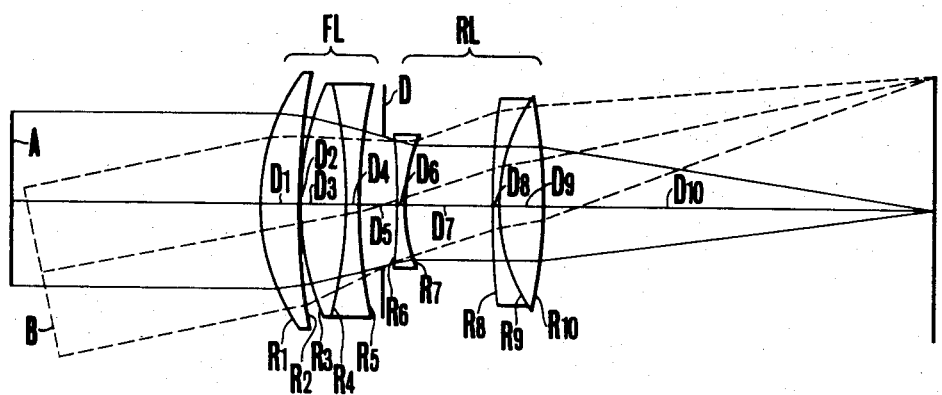
FIG. 5 shows the second embodiment of the lens in section in the ordinary photographing state.
Figure 6:
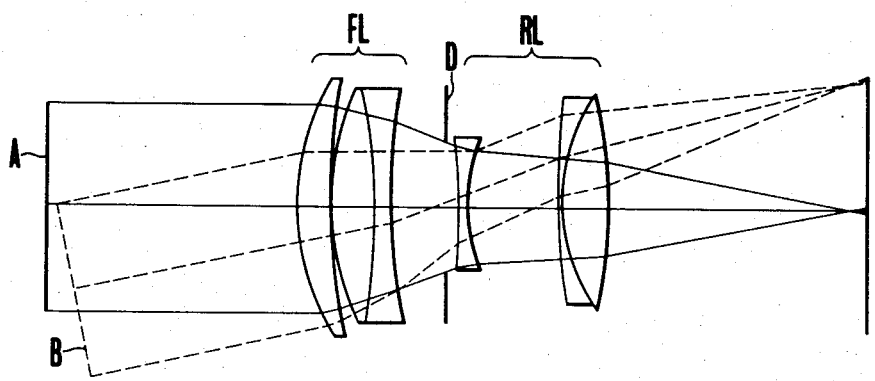
FIG. 6 shows the second embodiment of the lens in section in the soft-focus state.
Figures 8A, 8B, 8C:
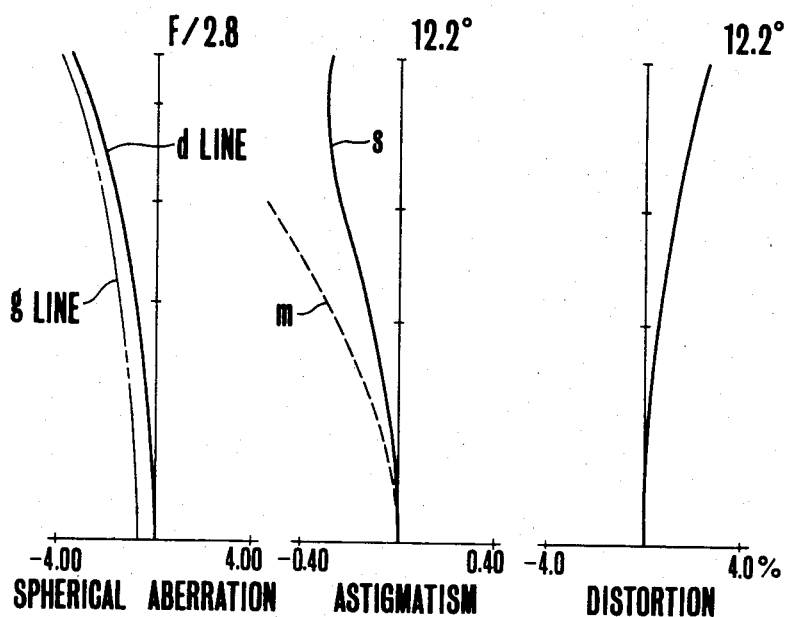
FIGS. 8A to 8G respectively show the curve of an aberration of the second embodiment in the soft-focus state.
Figure 8D:
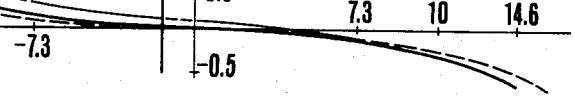
Figure 8E:
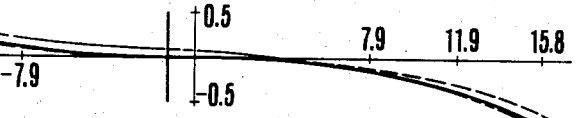
Figure 8F:
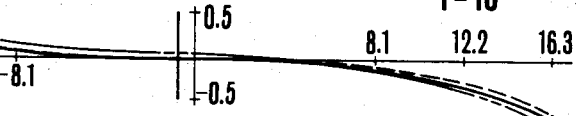
Figure 8G:
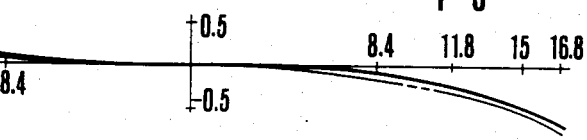
Figure 9:
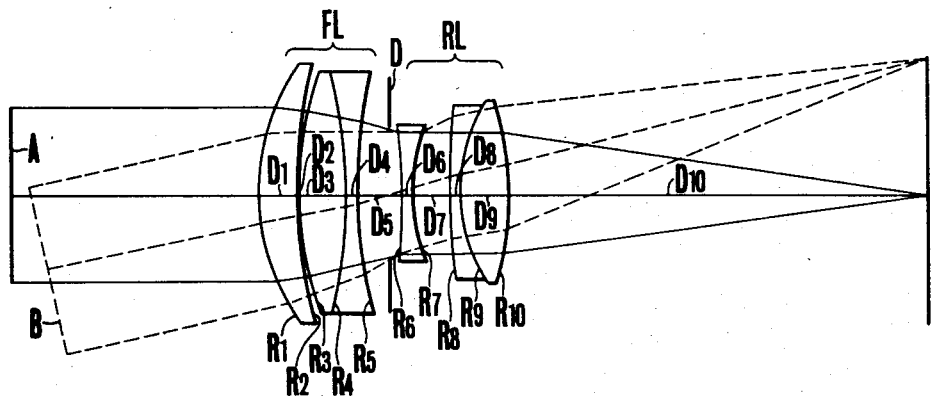
FIG. 9 shows the third embodiment of the lens in section in the ordinary photographing state.
Figure 10:
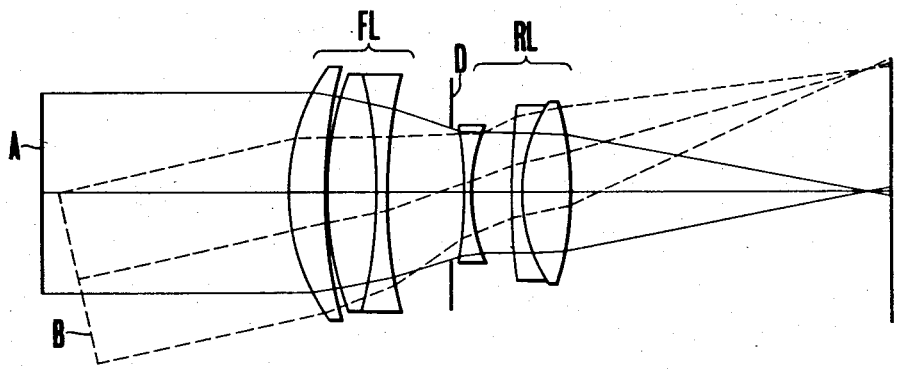
FIG. 10 shows the third embodiment of the lens in section in the soft-focus state.
Figures 11A, 11B, 11C:
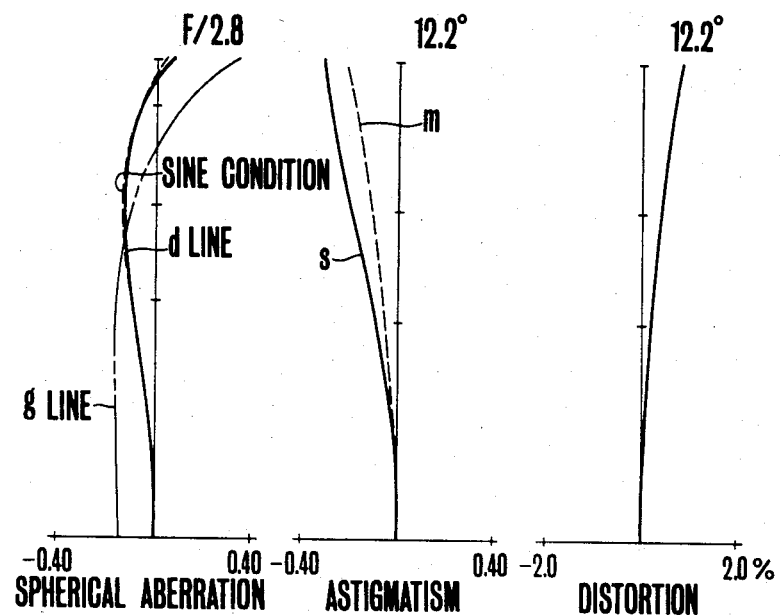
FIGS. 11A to 11G respectively show the curve of an aberration of the third embodiment in the ordinary photographing state.
Figure 11D:
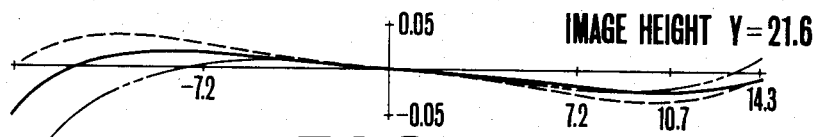
Figure 11E:
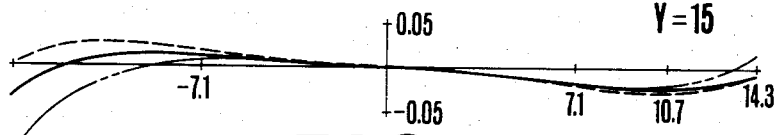
Figure 11F:
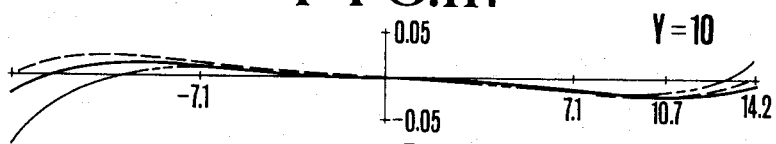
Figure 11G:
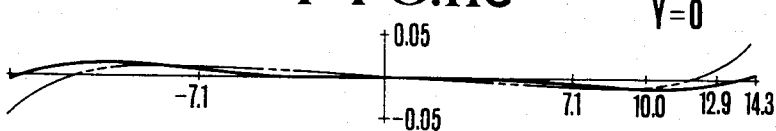

In FIGS. 1 and 2, FIGS. 5 and 6, and FIGS. 9 and 10, FL is the front lens group, RL is the rear lens group and D represents the aperture. Further, A represents the on-axial rays, while B is the off-axial rays. Hereby, FIGS. 1, 5 and 9 show the ordinary photographing state, while FIGS. 2, 6 and 10 show the soft-focus state, whereby an object at the same distance is focused. When the ordinary photographing state is brought into the soft-focus states, the rear lens group RL is moved toward the image side faster than the front lens group FL, whereby the air gap is enlarged in the soft-focus state, while the soft-focus state can be obtained because the aberration condition is only inversed even if the air gap is made small. However, it must be noted that it is convenient that the total lens length is shorter in the ordinary photographing state in which pictures are taken most often.

Below the setting reasons for the above conditions will be explained.

The condition (1) strengthens the refraction power of the front lens group so as to determine the optional range. Hereby, the on-axial rays coming from the front lens group is made a strongly convergent rays so that the height of the on-axial rays incident upon the rear lens group changes substantially when the air gap is changed, in such a manner that a large variation of the spherical aberration becomes possible. Beyond the lower limit value of the condition, it is difficult to cause a sufficient variation of the spherical aberration even if the air gap is changed, while beyond the upper limit value it becomes difficult to correction the aberrations in the ordinary state.

With reference to the front lens group, especially the first lens, which has an effect of causing a large positive spherical aberration, checking the growth of the astigmatism and the coma, the conditions (2) and (3) are given to the shape and the refraction index. Namely, the first lens is constituted of glass material with comparatively low refraction index and shaped in a strongly meniscus form so as to cause a large positive spherical aberration, checking the growth of the astigmatism. Beyond the lower limit value of the condition (2) and the upper limit value of the condition (3) a large negative spherical aberration may be not expected, while beyond the upper limit value of the condition (2) and the lower limit value of the condition (3) it is difficult to correct the coma and the astigmatism in the ordinary photographing state efficiently.

Further, a strong radius of curvature is given to the rear surface of the bi-concave lens in the rear lens group so as to obtain a large positive spherical aberration. Beyond the upper limit value of the condition (4), a large positive spherical aberration of the rear lens group may not be expected, while beyond the lower limit value, the efficient correction of the aberrations in the ordinary photographing state cannot be obtained.

The condition (5) is for compensating the large distortion of the image surface due to the adoption of the condition (3) by constituting other positive lenses out of glass material with high refraction index, whereby beyond the limit values it becomes difficult to compensate the image surface distortion efficiently.

The conditions (6) and (7) are those for the chromatic aberration. In order to realize nearly achromatic lens groups, the negative lens in the front lens group with a positive refraction power is constituted out of glass material with small Abbe's number, while the negative lens in the rear lens group with a negative refraction power is constituted out of glass material with comparatively large Abbe's number. In this way, a good chromatic aberration can be obtained even if the air gap is changed out of the ordinary photographing state into the soft-focus state. Beyond the upper limit value of the condition (6), the chromatic aberration of the front lens group is under-corrected, while beyond the lower limit value the aberration is over-corrected, which is not advantageous. Further, beyond the upper limit value of the condition (7) the chromatic aberration of the rear lens group is under-corrected, while beyond the lower limit value it is over-corrected, which is also not advantageous.

Below, the embodiments of the present invention will be given in numerical figures, whereby Ri is the radius of curvature of the lens in sequence from the front lens to the rear lens, Di is the lens thickness or the lens air gap in sequence, Ni is the refraction index in sequence, and $vi$ is the Abbe's number of lens in sequence. Further in the tables of the third aberration coefficient, I is the spherical aberration, II is the coma index, III is the astigmatism, P is the Petzval sum and V is the distortion.

| Embodiment 1: |
|---|
| f = 100  f-No. = 2.8  Picture angle 2ω = 24.4° |

| | | | |
|---|---|---|---|
| $R_1$ = 36.682 | $D_1$ = 5.5 | $N_1$ = 1.51633 | $v_1$ = 64.1 |
| $R_2$ = 112.327 | $D_2$ = 0.15 | | |
| $R_3$ = 46.906 | $D_3$ = 7. | $N_2$ = 1.7725 | $v_2$ = 49.6 |
| $R_4$ = −88.965 | $D_4$ = 2. | $N_3$ = 1.68893 | $v_3$ = 31.1 |
| $R_5$ = 64.490 | $D_5$ = variable gap | | |
| $R_6$ = −89.435 | $D_6$ = 1.5 | $N_4$ = 1.6968 | $v_4$ = 55.5 |
| $R_7$ = 29.840 | $D_7$ = 9.38 | | |
| $R_8$ = 150.944 | $D_8$ = 1.5 | $N_5$ = 1.66998 | $v_5$ = 39.3 |
| $R_9$ = 33.180 | $D_9$ = 7. | $N_6$ = 1.7725 | $v_6$ = 49.6 |
| $R_{10}$ = −64.358 | | | |

| Aberration Coefficient (Ordinary State) $D_5$ = 6.5 | | | | |
|---|---|---|---|---|
| | I | II | III | P | V |
| 1 | 4.816 | 0.853 | 0.151 | 0.946 | 0.194 |
| 2 | 0.047 | −0.154 | 0.504 | −0.259 | −0.800 |
| 3 | −0.187 | −0.190 | −0.193 | 0.909 | 0.726 |
| 4 | 1.707 | −0.633 | 0.235 | 0.031 | −0.098 |
| 5 | 0.517 | −0.827 | 1.321 | −0.551 | −1.229 |
| 6 | −6.417 | 3.364 | −1.763 | −0.396 | 1.132 |
| 7 | −3.026 | −1.941 | −1.244 | −1.427 | −1.713 |
| 8 | 0.044 | 0.126 | 0.365 | 0.207 | 1.649 |

-continued

Embodiment 1:

|   | | | | | |
|---|---|---|---|---|---|
| 9 | 0.559 | 0.390 | 0.272 | 0.105 | 0.263 |
| 10 | 2.386 | −0.913 | 0.349 | 0.607 | −0.366 |
| Σ | 0.446 | 0.074 | −0.000 | 0.170 | −0.242 |

(Soft-Focus State) $D_5 = 11.5$

|   | I | II | III | P | V |
|---|---|---|---|---|---|
| 1 | 3.696 | 0.287 | 0.022 | 0.946 | 0.0753 |
| 2 | 0.036 | −0.139 | 0.539 | −0.259 | −1.0764 |
| 3 | −0.144 | −0.148 | −0.153 | 0.909 | 0.7803 |
| 4 | 1.310 | −0.718 | 0.393 | 0.031 | −0.2329 |
| 5 | 0.397 | −0.774 | 1.507 | −0.551 | −1.8619 |
| 6 | −3.881 | 2.773 | −1.981 | −0.396 | 1.6989 |
| 7 | −0.681 | −0.763 | −0.855 | −1.427 | −2.5582 |
| 8 | 0.000 | 0.000 | 0.006 | 0.207 | 2.3513 |
| 9 | 0.127 | 0.157 | 0.194 | 0.105 | 0.3710 |
| 10 | 1.293 | −0.693 | 0.371 | 0.607 | −0.5249 |
| Σ | 2.154 | −0.019 | 0.045 | 0.170 | −0.9774 |

Embodiment 2:

$f = 100$   f-No. $= 2.8$   Picture angle $2\omega = 24.4°$

| $R_1 = 37.82$ | $D_1 = 6.$ | $N_1 = 1.58913$ | $\nu_1 = 61.1$ |
|---|---|---|---|
| $R_2 = 125.11$ | $D_2 = 0.15$ | | |
| $R_3 = 45.747$ | $D_3 = 7.3$ | $N_2 = 1.7725$ | $\nu_2 = 49.6$ |
| $R_4 = -96.308$ | $D_4 = 2.$ | $N_3 = 1.6727$ | $\nu_3 = 32.1$ |
| $R_5 = 76.176$ | $D_5 =$ variable gap | | |
| $R_6 = -141.85$ | $D_6 = 1.5$ | $N_4 = 1.757$ | $\nu_4 = 47.9$ |
| $R_7 = 27.72$ | $D_7 = 14.31$ | | |
| $R_8 = 122.93$ | $D_8 = 1.5$ | $N_5 = 1.2352$ | $\nu_5 = 41.1$ |
| $R_9 = 29.454$ | $D_9 = 7.5$ | $N_6 = 1.7725$ | $\nu_6 = 49.6$ |
| $R_{10} = -86.789$ | | | |

Aberration Coefficient (Ordinary State) $D_5 = 6.5$

|   | I | II | III | P | V |
|---|---|---|---|---|---|
| 1 | 4.312 | 0.795 | 0.146 | 0.980 | 0.208 |
| 2 | 0.061 | −0.189 | 0.585 | −0.296 | −0.892 |
| 3 | −0.211 | −0.207 | −0.203 | 0.952 | 0.735 |
| 4 | 2.016 | −0.775 | 0.298 | 0.034 | −0.128 |
| 5 | 0.938 | −1.209 | −1.558 | −0.527 | −1.328 |
| 6 | −6.531 | 3.601 | −1.986 | −0.303 | 1.263 |
| 7 | −2.101 | −1.518 | −1.097 | −1.554 | −1.916 |
| 8 | 0.029 | 0.093 | 0.298 | 0.344 | 2.046 |
| 9 | 0.160 | 0.140 | 0.123 | 0.041 | 0.144 |
| 10 | 1.597 | −0.631 | 0.249 | 0.502 | −0.297 |
| Σ | 0.271 | 0.100 | −0.026 | 0.173 | −0.166 |

(Soft-Focus State) $D_5 = 11.5$

|   | I | II | III | P | V |
|---|---|---|---|---|---|
| 1 | 3.138 | 0.239 | 0.018 | 0.980 | 0.076 |
| 2 | 0.044 | −0.168 | 0.631 | −0.296 | −1.260 |
| 3 | −0.153 | −0.155 | −0.156 | 0.952 | 0.804 |
| 4 | 1.467 | −0.866 | 0.512 | 0.034 | −0.323 |
| 5 | 0.682 | −1.127 | 1.861 | −0.527 | −2.201 |
| 6 | −3.729 | 2.916 | −2.280 | −0.303 | 2.020 |
| 7 | −0.278 | −0.398 | −0.571 | −1.554 | −3.046 |
| 8 | −0.000 | −0.008 | −0.237 | 0.344 | 2.939 |
| 9 | 0.020 | 0.038 | 0.069 | 0.041 | 0.202 |
| 10 | 0.759 | −0.441 | 0.256 | 0.502 | −0.440 |
| Σ | 1.951 | 0.027 | 0.103 | 0.173 | −1.229 |

Embodiment 3:

$f = 100$   f-No. $= 2.8$   Picture angle $2\omega = 24.4°$

| $R_1 = 37.359$ | $D_1 = 6.$ | $N_1 = 1.58913$ | $\nu_1 = 61.1$ |
|---|---|---|---|
| $R_2 = 93.471$ | $D_2 = 0.15$ | | |
| $R_3 = 54.505$ | $D_3 = 8.$ | $N_2 = 1.7725$ | $\nu_2 = 49.6$ |
| $R_4 = -90.008$ | $D_4 = 2.$ | $N_3 = 1.72825$ | $\nu_3 = 28.5$ |
| $R_5 = 98.768$ | $D_5 =$ variable gap | | |
| $R_6 = -90.867$ | $D_6 = 2.$ | $N_4 = 1.6968$ | $\nu_4 = 55.5$ |
| $R_7 = 30.044$ | $D_7 = 1.5$ | | |
| $R_8 = 132.58$ | $D_8 = 6.44$ | $N_5 = 1.64328$ | $\nu_5 = 47.9$ |
| $R_9 = 26.314$ | $D_9 = 1.5$ | $N_6 = 1.713$ | $\nu_6 = 53.9$ |
| $R_{10} = -60.710$ | $D_{10} = 8.$ | | |

Embodiment 3:

Aberration Coefficient (Ordinary State) $D_5 = 5.0$

|   | I | II | III | P | V |
|---|---|---|---|---|---|
| 1 | 4.473 | 0.764 | 0.130 | 0.992 | 0.191 |
| 2 | 0.000 | 0.007 | 0.379 | −0.396 | −0.804 |
| 3 | −0.126 | −0.162 | −0.207 | 0.799 | 0.758 |
| 4 | 0.679 | −0.275 | 0.111 | 0.016 | −0.051 |
| 5 | 0.698 | −0.977 | 1.367 | −0.426 | −1.316 |
| 6 | −5.753 | 3.112 | −1.683 | −0.451 | 1.155 |
| 7 | −3.338 | −2.133 | −1.363 | −1.366 | −1.745 |
| 8 | 0.164 | 0.311 | 0.591 | 0.295 | 1.681 |
| 9 | 0.806 | 0.443 | 0.244 | 0.094 | 0.186 |
| 10 | 2.892 | −1.074 | 0.399 | 0.685 | −0.402 |
| Σ | 0.497 | 0.016 | −0.031 | 0.240 | −0.347 |

(Soft-Focus State) $D_5 = 10.5$

|   | I | II | III | P | V |
|---|---|---|---|---|---|
| 1 | 3.534 | 0.190 | 0.010 | 0.992 | 0.054 |
| 2 | 0.000 | 0.006 | 0.377 | −0.396 | −1.007 |
| 3 | −0.100 | −0.130 | −0.169 | 0.799 | 0.820 |
| 4 | 0.536 | −0.319 | 0.190 | 0.016 | −0.122 |
| 5 | 0.551 | −0.944 | 1.618 | −0.426 | −2.040 |
| 6 | −3.508 | 2.577 | −1.893 | −0.451 | 1.722 |
| 7 | −0.820 | −0.901 | −0.990 | −1.366 | −2.589 |
| 8 | 0.011 | 0.052 | 0.237 | 0.295 | 2.423 |
| 9 | 0.223 | 0.207 | 0.192 | 0.094 | 0.265 |
| 10 | 1.579 | −0.821 | 0.427 | 0.685 | −0.578 |
| Σ | 2.009 | −0.083 | 0.000 | 0.240 | −1.052 |

What is claimed is:

1. A variable soft-focus lens comprising:
a front lens group including a positive meniscus lens with a convex surface at the object side and a positive meniscus compound lens with a convex surface at the object side in sequence; and
a rear lens group including an aperture, a negative lens with a concave surface at the image side and a positive compound lens, the air space between the front lens group and said rear lens group being variable so as to produce the soft-focus effect;
whereby the following conditions are satisfied:
(1) $1.7(1/f) < 1/f_1 < 2.2(1/f)$
(2) $0.4 < |(R_1 - R_2/R_1 + R_2)| < 0.6$   $0 < R_1,\ 0 < R_2$
wherein
f: Focal length of the total system
$f_1$: Focal length of the front lens group
$R_1$: Radius of curvature of the front surface of the positive meniscus lens
$R_2$: Radius of curvature of the rear surface of the positive meniscus lens
$N_1$: Refraction index of the positive meniscus lens
$R_7$: Radius of curvature of the rear surface of the negative lens.

2. A variable soft-focus lens in accordance with claim 1, wherein the positive compound meniscus lens consists of a bi-convex lens and a bi-concave lens cemented on each other, while the positive compound lens consists of a negative lens and a bi-convex lens cemented on each other, whereby the following conditions are satisfied:

$28 < \nu_3 < 35$ $40 < (\nu_4 + \nu_5)/2 < 55$ wherein
$\nu_3$: Abbe's number of the bi-concave lens in the positive compound meniscus lens
$\nu_4$: Abbe's number of the negative lens with a concave surface at the image side $\nu_5$: Abbe's number of the negative lens in the positive compound lens.

3. A variable soft-focus lens comprising:

a displaceable front lens group comprising a positive meniscus lens with a convex surface at the object side and a positive compound meniscus lens consisting of a bi-convex lens and a bi-concave lens cemented on each other; and a displaceable rear lens group comprising, in serial order, an aperture, a bi-concave lens with a strong surface at the image side and a positive compound lens consisting of a negative and a bi-convex lens cemented on each other;

the displacement amount of the front lens group toward the image side is different from that of the rear lens group whereby spherical aberration sufficient to realize the soft-focus effect is provided.

* * * * *